United States Patent [19]

Chamberlin

[11] 4,296,950
[45] Oct. 27, 1981

[54] CORROSION RESISTANT PIPE JOINT
[75] Inventor: Richard L. Chamberlin, Bradford, Pa.
[73] Assignee: Dresser Industries, Inc., Dallas, Tex.
[21] Appl. No.: 58,697
[22] Filed: Jul. 18, 1979
[51] Int. Cl.³ .............................................. F16L 19/06
[52] U.S. Cl. .................................... 285/45; 285/342; 285/354; 285/355
[58] Field of Search ................. 285/45, 235, 260, 110, 285/342, 354, 355

[56]     References Cited
        U.S. PATENT DOCUMENTS

| 1,869,059 | 7/1932 | Hanson | 285/235 X |
| 2,265,615 | 12/1941 | Stalter | 285/110 X |
| 3,380,763 | 4/1968 | Schmunk | 285/110 |
| 3,535,136 | 10/1970 | Beene | 285/45 X |
| 3,784,236 | 1/1974 | Slocum | 285/45 |
| 3,799,584 | 3/1974 | Slocum | 285/45 |
| 3,915,478 | 10/1975 | Al et al. | 285/45 |

FOREIGN PATENT DOCUMENTS

| 1080305 | 8/1967 | United Kingdom | 285/235 |
| 1175182 | 12/1969 | United Kingdom | 285/235 |

Primary Examiner—Thomas F. Callaghan
Attorney, Agent, or Firm—Daniel Rubin

[57] ABSTRACT

Pipe joint components such as a metallic sleeve and companion nut of a compression-type pipe coupling are externally coated with a corrosion-resistant polymeric plastic. In a preferred embodiment the coating on the female of the components extends as a flexible skirt beyond the mating end face thereof to include an internally integral annular O-ring formation. The coating on the male fitting terminates behind the threads thereof in an annular ramp or boss adapted in assembly to be engaged by the O-ring coating formation of the female fitting. Cooperation of the engaging O-ring and ramp effects a moisture seal relation thereat.

8 Claims, 7 Drawing Figures

CORROSION RESISTANT PIPE JOINT

TECHNICAL FIELD

The field of art to which the invention pertains includes the art of pipe joints and pipe couplings, including liners and protectors therefor.

BACKGROUND OF PRIOR ART

Threaded connections are widely used for effecting a leak-proof joint with joined pipe sections whether it be a conduit joint, coupling joint or other form of fitting. Exemplifying couplings of the compression type for that purpose is the disclosure of U.S. Pat. No. 3,194,592 in which a nut is threaded onto a sleeve for effecting a gasket seal with a contained pipe end. A frequent application for compression couplings is in connection with buried underground piping for which it has been common practice to apply a chemically protective coating on the coupling components either before or after installation.

Prior coating practices have operated reasonably well where extreme care is exercised to insure against any void in the exposed surfaces including that of the engaged threads. Failure to observe adequate care can, however, expose any voided area to corrosive attack and thereby defeat the purpose for which the coating had been applied. At the same time, post-installation coating, particularly in underground installations with which such couplings are commonly used, can be most difficult if not impossible to effect with any degree of reliability. Yet when the components, including the threads, have been precoated, there is always the risk that a coating if too thick will interfere with the threading action and if too thin will flake or otherwise be affected adversely by abrasion in the course of assembling the joint. With the advent of plastic coatings, various constructions have been proposed for enhancing the desired protection. Exemplifying the latter is the disclosure of U.S. Pat. No. 3,799,584 in which the assembled metal coupling is completely shrouded in a protective coating of a polymeric plastic. Yet another approach has been to utilize a plastic-to-plastic thread formation in the assembled joint as disclosed in U.S. Pat. No. 3,915,478.

SUMMARY OF THE INVENTION

The invention relates to threaded pipe joints and more specifically to pipe couplings of the compression type afforded corrosion-resistance by use of plastic coatings. In accordance with the invention, the coatings on the mating ends of the interfitting components when assembled are overlapped into a coating sealed relation by means of an annular O-ring on one component cooperating with an annular ramp on the other component and both integrally formed of their respective coating compositions. This is achieved in the preferred embodiment by extending the coating as a flexible skirt beyond the mating end face of the female component and which skirt includes an annular integral O-ring formation on its internal face. The coating of the male fitting terminates behind the threads thereof as an annular ramp or boss adapted in assembly to be engaged by the O-ring formation. On assembly into joint formation, the O-ring and ramp cooperate to provide a seal that is leak-tight against ground seepage or other corrosive exposure of the installation environment. Not only does the construction hereof eliminate the aforesaid problems associated with pre-installation or post-installation coating techniques currently practiced, but at the same time has been found more effective in sealing the metal threads of the joint against ground seepage than similar purpose constructions of the prior art. Moreover, it has been found that the sealing relation hereof is not only more effective in producing the degree of sealing sought to be achieved, but likewise is less costly to manufacture than similar purpose constructions of the prior art.

It is therefore an object of the invention to provide a novel construction for enhancing corrosion protection afforded a threaded pipe joint.

It is a further object of the invention to provide a threaded pipe joint in accordance with the previous object for a compression-type metal pipe coupling.

It is a still further object of the invention to effect the aforesaid objects with a pre-applied thermoplastic coating that is highly reliable, yet relatively simple and of minimal cost as compared to prior art techniques therefor.

BRIEF DESCRIPTION OF THE DRAWINGS

Referring now to FIGS. 1-3 of the drawings, there is disclosed a preferred embodiment of the invention in the form of a compression-type coupling, generally designated 10, for joining pipe ends 12 and 14. Comprising the coupling per se is an elongated tubular sleeve 16 of forged metal having opposite ends 18 peripherally threaded at 20. Internally at end 18, the sleeve includes a frusto-conical inward chamfer 22 defining a recess for receiving an annular resilient gasket 24 of composition compatible with the piping line content with which the coupling is to be utilized. Gasket 24 may, for example, comprise a type disclosed in U.S. Pat. No. 3,259,406 having an annular metal ring 26 effecting electrical contact between the pipe end and sleeve thereat for purposes of cathodic protection.

Figure 1:
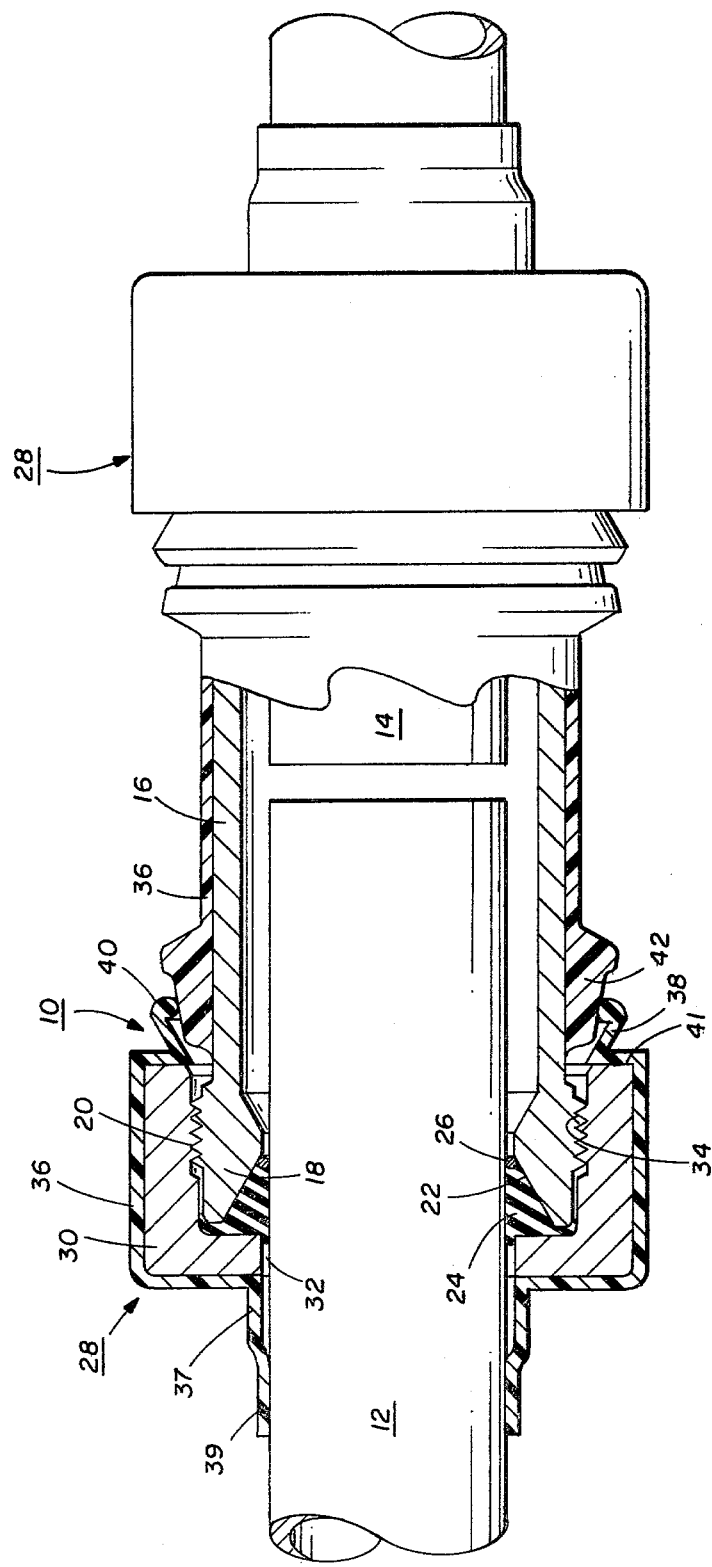
FIG. 1 is a plan view partially sectioned of an assembled coupling construction in accordance herewith.

Adapted to cooperate with sleeve 18 for compressing gasket 24 into a pressure-type seal within the cavity therebetween is a hollow nut 28 having a conventional cupshaped metal body 30 centrally bored at 32 to accommodate pipe end 12. The nut in turn is internally threaded at 34 for fastening engagement with sleeve thread 20 to form or disconnect the shown joint.

External corrosion protection for both sleeve 16 and nut 28 is provided by means of a moisture impervious, resilient polymeric plastic layer 36 bonded to the metal substrate of each by coating or molding in a well known manner. Preferably, although not necessarily, layer 36 on each component comprises a like coating of moisture impervious, chemical and impact-resistant polymeric composition such as polyvinyl chloride (PVC). One or both can likewise comprise such other compositions as nylon, polyethylene, polypropylene, polyurethane or the like. The coating is generally of uniform thickness about both the sleeve and nut and serves to enclose at least the otherwise exposed periphery of each when assembled in joint formation.

For effecting the joint seal in accordance herewith, coating 36 on nut 30 extends thereabout from a sleeve-like tail 37 necked down or adapted to be taped down at 39 to radially over the front face 41 of the nut. Axially forward of nut face 41, the integral coating extends as a tapered skirt 38 to its distal end formed as radially inward annular bead 40. Provided on sleeve 16 for cooperating with bead 40 in assembly is an annular ramp or boss 42 of coating composition 36 terminating behind metal thread 20 and diametrically enlarged as compared to the remainder of coating thereon. When assembled as in FIG. 1 bead 40 flexibly cooperates with the surface of ramp 42 to effect a moisture seal relation therewith.

Figure 2:
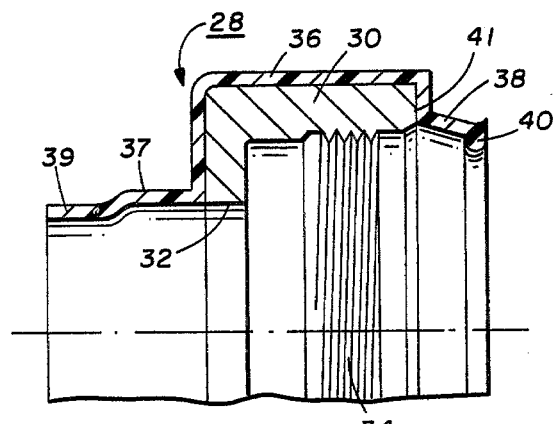
FIGS. 2 and 3 are fragmentary sectional views of the separated coupling components of FIG. 1.
Figure 3:
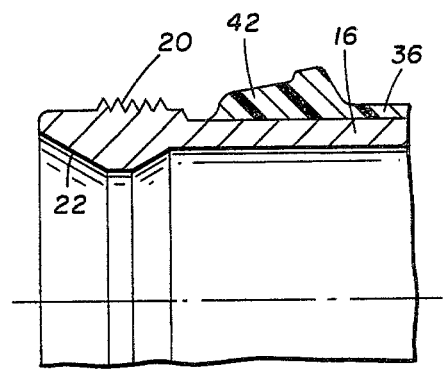

It can be seen by comparing FIGS. 1 and 2 that skirt 38 in its as-molded state of FIG. 2 extends frusto-conically inward toward bead 40 but on assembly as in FIG. 1 is forced frusto-conically outward in order to afford the desired seal integrity between bead 40 and the surface of ramp 42. In this relation, bead 40 functions in the manner of a resilient O-ring seal which in cooperation with the surface of ramp 42 affords a sealing engagement therewith. By appropriate choice of the affected parameters, the desired seal loading can obviously be varied to suit the application such as the ability to withstand seepage forces or the like normally associated with buried underground installations for which these couplings are customarily utilized.

Figure 4:
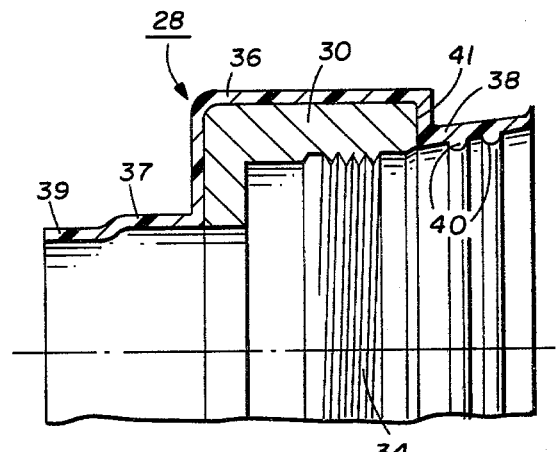
FIGS. 4 and 5 are fragmentary sectional views similar to FIGS. 2 and 3 for a first alternative embodiment thereof.
Figure 5:
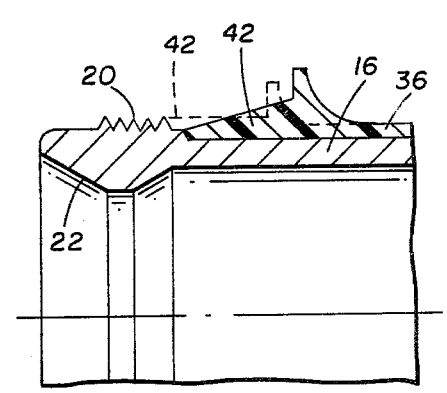

In the alternative embodiment of FIGS. 4 and 5, skirt 38 is of increased axial length as compared to that of FIG. 2 and includes two axially spaced internal O-ring beads 40 annularly formed at intermediate locations along the skirt rather than at the end. Both beads are adapted to engage with either the slope surface of ramp 42 shown solid in FIG. 5 or concentric surface of ramp 42' shown dashed. Use of this construction offers increased versatility for products or installations that might not readily lend themselves to the construction of FIG. 1.

Figure 6:
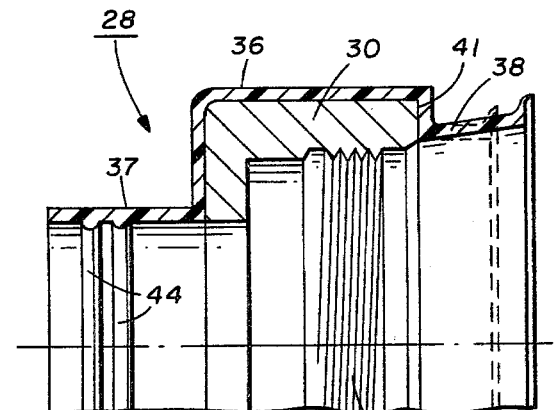
FIGS. 6 and 7 are fragmentary sectional views similar to FIGS. 2 and 3 for a second alternative embodiment thereof.
Figure 7:
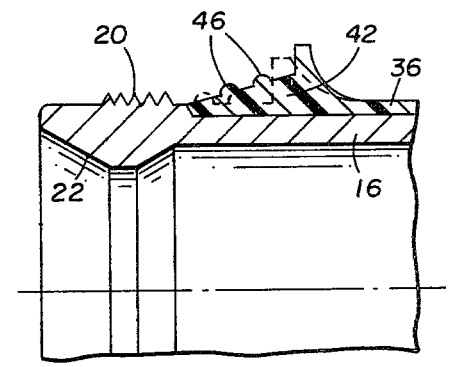

For the alternative embodiment of FIGS. 6 and 7, tail portion 37 of coating 36 is not necked down as in the previous embodiments but rather per se includes a pair of annular beads 44 integrally formed internally of coating 36 thereat to engage directly with the surface of a received pipe section. By engaging the pipe surface in that manner, beads 44 provide a positive seal against leakage to inward of the nut. On the opposite end, forming the O-ring seal interfit is interchanged with respect to the previous embodiments. That is, ramp 42, as can be seen, also includes integral annular beads 46 raised radially outward on its surface for internally engaging smooth skirt 38 extending axially outward beyond face 41 of nut 30. This alternate embodiment further enhances versatility of the fundamental sealing principle hereof for the variety of products on which it could be used.

It can be readily understood that with any of the foregoing embodiments, mounting nut 28 onto the end of sleeve 16 will enable threads 20 and 34 to be engaged and connected in a customary manner for compression gasket 24 into a sealing relation with pipe end 12. In the course of connection, coating composition annular beads 40 or 46 on one of the coated components will engage with the mating composition surface provided by the other component. As the engaging force is threadedly increased, a compressive engagement between the mating composition surfaces is enhanced. With chemical composition of coating 36 being characterized by resilient properties, the ultimate compressive engagement serves to effect an annular seal adequate to resist any ingress of ground moisture for buried installations. This can, of course, be varied to suit by employing any suitable number of sealing beads to meet a particular need and will likewise, of course, vary with the specific elastomeric properties of the selected coating composition.

By the above description there is disclosed a novel coating construction for a pipe joint that is reliably effective in sealing the metal pipe threads of the joint. By virtue of its relative simplicity in principle it is able to insure substantially foolproof installation assembly under even the most adverse of field conditions. When installed in the conventional manner, the joint components such as nut 28 when threaded onto sleeve threads 20 will cause the annular O-ring of the coating composition to engage with the mating ramp and which together cooperate to effect an adequate seal for the conditions intended without need to test or otherwise ascertain the existence of required closure contact therebetween. Not only does the novel construction hereof achieve the foregoing results, but the specific features by which those results are obtained present a relatively inexpensive construction which per se contributes toward its overall novelty. It should be understood, of course, that the invention could be employed or adapted for a variety of threaded joints beyond the described embodiments.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. In pipe joint forming members including a first metal component having a male thread and a second metal component having a female thread, corrosion protection for the joint adapted to be provided by said components and comprising in combination:
   (a) a first polymeric plastic coating formed about the periphery of said male threaded component and terminating behind the thread thereof;
   (b) a second polymeric plastic coating formed about the periphery of said female threaded component and terminating in an annular flexible skirt extending beyond the joint forming end thereof, said skirt being adapted when said male and female components are threadedly assembled in joint formation to surroundingly overlap a portion of the coating on said male component; and
   (c) at least one polymeric plastic annular lip of locally beaded cross-section integrally formed extending radially inward on an opposing surface of at least one of said overlapped skirt or coating thereat;
   (d) said lip being adapted to cooperate with said opposing surface at any longitudinal location along the mutual overlap therebetween in the course of assembling said components to effect a threadlessly compressive sealing engagement enclosing the metal threads of the joint formation.

2. In pipe joint forming members according to claim 1 in which said annular lip is contained on one of said opposing surfaces and the other of said opposing surfaces comprises an annular frusto-conical ramp engageable by said lip in said assembled joint formation.

3. In pipe joint forming members according to claim 2 in which said annular lip is contained about the internal surface of said skirt and said overlapped coating of said male threaded component comprises said annular ramp.

4. In pipe joint forming members according to claim 1 in which said opposing surface on which said lip is formed is ramped.

5. In pipe joint forming members according to claim 4 in which said ramped surface includes two of said at least one annular lip longitudinally spaced apart on said ramped surface.

6. In pipe joint forming members according to claims 1, 2, 3, 4 or 5 in which said pipe joint forming members comprise a compression-type coupling.

7. In pipe joint forming members according to claim 6 in which said second polymeric plastic coating formed on said female threaded component includes a second annular flexible skirt at the end opposite said first recited skirt and extending in a direction away from the joint forming end thereof.

8. In pipe joint forming members according to claim 7 in which said second annular skirt includes at least one polymeric plastic annular lip integrally formed radially inward about the internal surface thereof and adapted to sealingly engage a received pipe wall surface thereat of a pipe section to be jointed.

* * * * *